(12) United States Patent
Al et al.

(10) Patent No.: US 10,934,221 B2
(45) Date of Patent: Mar. 2, 2021

(54) SPECIAL FERTILIZER FOR CUT SIDE SLOPE SOIL REMEDIATION IN HIGH ALTITUDE AREAS

(71) Applicant: SICHUAN UNIVERSITY, Chengdu (CN)

(72) Inventors: Yingwei Al, Chengdu (CN); Dongqing Fu, Chengdu (CN); Xiaoyan Al, Chengdu (CN); Dapeng Xu, Chengdu (CN); Shenghao Al, Chengdu (CN)

( * ) Notice: Subject to any disclaimer, the term of this patent is extended or adjusted under 35 U.S.C. 154(b) by 80 days.

(21) Appl. No.: 16/443,877

(22) Filed: Jun. 18, 2019

(65) Prior Publication Data

US 2020/0123073 A1 Apr. 23, 2020

(30) Foreign Application Priority Data

Oct. 22, 2018 (CN) .......................... 201811228296.7

(51) Int. Cl.

| | | |
|---|---|---|
| *C05B 7/00* | (2006.01) | |
| *C05C 11/00* | (2006.01) | |
| *C05D 1/00* | (2006.01) | |
| *C05D 1/02* | (2006.01) | |
| *C05F 3/00* | (2006.01) | |
| *C05F 5/00* | (2006.01) | |
| *B09C 1/08* | (2006.01) | |

(52) U.S. Cl.
CPC ................ *C05B 7/00* (2013.01); *C05C 11/00* (2013.01); *C05D 1/005* (2013.01); *C05D 1/02* (2013.01); *C05F 3/00* (2013.01); *C05F 5/008* (2013.01); *B09C 1/08* (2013.01)

(58) Field of Classification Search
CPC ........... C05B 7/00; C05C 11/00; C05D 1/005; C05D 1/02; C05D 9/00; C05F 3/00; C05F 5/008; C05F 17/00; B09C 1/08; B09C 1/00; B09C 1/10; Y02P 20/145; Y02A 40/20; Y02W 30/40; C05G 3/00; C05G 3/80

See application file for complete search history.

(56) References Cited

U.S. PATENT DOCUMENTS

| | | |
|---|---|---|
| 7,875,096 B2 | 1/2011 | Van Rooijen |
| 2018/0297908 A1 | 10/2018 | Oy |
| 2019/0169078 A1 | 6/2019 | Le |

FOREIGN PATENT DOCUMENTS

| | | | |
|---|---|---|---|
| CN | 104591897 A | * | 5/2015 |
| CN | 106631619 A | | 5/2017 |
| CN | 108990713 A | * | 12/2018 |
| CN | 109678598 A | | 4/2019 |

* cited by examiner

*Primary Examiner* — Jennifer A Smith
(74) *Attorney, Agent, or Firm* — Erson IP (Nelson IP)

(57) ABSTRACT

The present invention provides a special fertilizer for cut side slope soil remediation in high altitude areas, which is prepared by effectively compounding raw material components of a yak manure-containing compost, an organic micro multi-element fertilizer, a chemical fertilizer, attapulgite powder and sodium alginate under certain conditions. The special fertilizer has obvious effects on the aspects of improving the physicochemical properties of artificial soil at cut side slope wounds in the high altitude areas, increasing the fertilizer efficiency and promoting vegetation restoration.

5 Claims, No Drawings

SPECIAL FERTILIZER FOR CUT SIDE SLOPE SOIL REMEDIATION IN HIGH ALTITUDE AREAS

CROSS-REFERENCE TO RELATED APPLICATIONS

This application claims priority to Chinese Patent Application No. 201811228296.7 with a filing date of Oct. 22, 2018. The content of the aforementioned applications, including any intervening amendments thereto, are incorporated herein by reference.

TECHNICAL FIELD

The present invention relates to a fertilizer, in particular to a special fertilizer for cut side slope soil remediation in high altitude areas.

BACKGROUND OF THE PRESENT INVENTION

The high altitude areas in China are mainly distributed in Qinghai-Tibet Plateau in Tibet, Qinghai, Sichuan, Gansu and Xinjiang. The altitude is generally above 3000 m, and the climate is very cold. The high-altitude Qinghai-Tibet Plateau is located in Southwest China, west of the Hengduan Mountains, north of the Himalayas, south of the Kunlun Mountains, the Altun Mountains and the Qilian Mountains, accounting for about 25% of the area of the country. With the progress of society and rapid economic development, construction projects, including highways, railways and hydropower, in the high altitude areas in China are gradually increased, and the geotechnical engineering construction in the engineering construction process often needs to cut side slopes. Cutting of the side slopes causes that the original soil vegetation coverage is stripped, resulting in serious damages to the regional ecological environment. Soil remediation is an important basis for ecological management of cut side slope wounds, and the fertilizer is an essential material for soil remediation. However, due to the lack of a targeted and well-proportioned special fertilizer with good use effect, a commercially available common fertilizer for farmland soil is still used in the process of cut side slope soil remediation in the high altitude areas, and the effects of artificial soil fertilization and vegetation restoration of the cut side slope wounds in the high altitude areas are not obvious due to the production problems of unreasonable fertilizer application, poor adaptability of the fertilizer, low utilization rate of the fertilizer and the like.

SUMMARY OF PRESENT INVENTION

The purpose of the present invention is to provide a special fertilizer for cut side slope soil remediation in high altitude areas so as to overcome the deficiencies of the prior art. The special fertilizer has the characteristics of available raw materials, low production cost, stable performance, long-lasting fertilizer efficiency, high bioavailability and the like and has obvious effects on the aspects of improving the physicochemical properties of artificial soil at cut side slope wounds in the high altitude areas, increasing the fertilizer efficiency and promoting vegetation restoration.

The purpose of the present invention is achieved by the following technical solution: a preparation method for the special fertilizer for cut side slope soil remediation in the high altitude areas contains the following steps:

(1) uniformly mixing yak manure, sheep manure, vinasse, sawdust, and chitin oligosaccharides with a weight ratio of (35-70) to (0-50) to (5-50) to (0-25) to (0-35), and then performing aerobic composting on a mixture to obtain a sample 1;

(2) putting at least one of tartaric acid, lysine, valonia extract and diglycolamine with the weight percent of 10-35% into a reaction kettle; dissolving the component with at least one of the water and the hydrogen peroxide with the weight percent of 10-35%; then adding the following components in percentage by weight into the reaction kettle: 10-40% of borax, 15-50% of zinc sulfate, 10-40% of ferrous sulfate, 5-35% of copper sulfate and 5-35% of manganese sulfate; performing a complicated reaction for 0.5-6 hours at 70-130° C.; pressurizing by 2-6 kg/cm$^2$ after performing cooling to room temperature; and standing for 10-50 hours, and curing and drying to obtain a sample 2; and (3) mixing the following components in percentage by weight: 5-30% of the sample 1, 5-20% of the sample 2, 55-85% of the chemical fertilizer, 0.5-5% of the attapulgite powder and 0.5-5% of the sodium alginate to prepare a final product.

The chemical fertilizer is prepared from various effective elements in percentage by weight (by pure nutrients): 5-25% of nitrogen, 3-21% of phosphorus pentoxide and 5-21% of potassium oxide. The various effective elements in the chemical fertilizer are provided by the following substances respectively: nitrogen from urea or/and ammonium phosphate or/and ammonium sulfate, phosphorus from calcium superphosphate or/and diammonium phosphate or/and diammonium phosphate and potassium from potassium chloride or/and potassium sulfate or/and potassium dihydrogen phosphate.

A special fertilizer for cut side slope soil remediation in the high altitude areas contains the following components: a sample 1, a sample 2, a chemical fertilizer, attapulgite powder and sodium alginate; the sample 1 contains the following components: yak manure, sheep manure, vinasse, sawdust and chitin oligosaccharides; and the sample 2 contains one or more of tartaric acid, lysine, valonia extract and diglycolamine, one or more of water and hydrogen peroxide, borax, zinc sulfate, ferrous sulfate, copper sulfate and manganese sulfate.

The fertilizer contains the following components in percentage by weight: 5-30% of the sample 1, 5-20% of the sample 2, 55-85% of the chemical fertilizer, 0.5-5% of the attapulgite powder and 0.5-5% of the sodium alginate.

The sample 1 contains the following components in percentage by weight: the yak manure, the sheep manure, the vinasse, the sawdust and the chitin oligosaccharides with a weight ratio of (35-70) to (0-50) to (5-50) to (0-25) to (0-35).

The sample 2 contains the following components in percentage by weight: 10-35% of one or more of the tartaric acid, the lysine, the valonia extract and the diglycolamine, 10-35% of one ore more of the water and the hydrogen peroxide, 10-40% of the borax, 15-50% of the zinc sulphate, 10-40% of the ferrous sulfate, 5-35% of the copper sulphate and 5-35% of the manganese sulfate.

DETAILED DESCRIPTION OF PREFERRED EXAMPLES

The present invention is further described below in combination with the examples.

Example 1

The yak manure and the vinasse were uniformly mixed according to the weight ratio of 50 to 50, and then aerobic composting was performed on a mixture to obtain a yak manure-containing compost for later use; the tartaric acid with the weight percent of 25% was put into a reaction kettle and was dissolved with the water with the weight percent of 25%; then the following components in percentage by weight were added into the reaction kettle: 15% of the borax, 15% of the zinc sulfate, 10% of the ferrous sulfate, 5% of the copper sulfate and 5% of the manganese sulfate; the complicated reaction was performed for 2 hours at 100° C.; pressurization of 3 kg/cm$^2$ was performed after cooling is performed to room temperature; and the components were stood for 20 hours, and then cured and dried to prepare an organic micro multi-element fertilizer for later use; and the following components in percentage by weight were compounded: 20% of the yak manure-containing compost, 10% of the organic micro multi-element fertilizer, 25% of the ammonium sulfate, 18% of the ammonium phosphate, 25% of the potassium sulfate, 1% of the attapulgite powder and 1% of the sodium alginate, to prepare a final product.

Example 2

The operation procedures during preparation are the same as those of the example 1. Only the type, the quantity, the temperature, the time and the pressure intensity of the raw materials in the scope specified by the operation procedures of the present invention are changed, and the special fertilizer for cut side slope soil remediation in the high altitude areas of the present invention is also prepared.

What is claimed is:

1. A fertilizer for cut side slope soil remediation in high altitude areas, prepared by the following steps:
    (a) uniformly mixing yak manure, sheep manure, vinasse, sawdust, and chitin oligosaccharides with a weight ratio of (35-70) to (0-50) to (5-50) to (0-25) to (0-35) to obtain a mixture, and then performing aerobic composting on the mixture to obtain a sample 1;
    (b) putting at least one of tartaric acid, lysine, valonia extract and diglycolamine with the weight percent of 10-35% into a reaction kettle; dissolving a component with at least one of water and hydrogen peroxide with the weight percent of 10-35%; then adding the following components in percentage by weight into the reaction kettle: 10-40% of borax, 15-50% of zinc sulfate, 10-40% of ferrous sulfate, 5-35% of copper sulfate and 5-35% of manganese sulfate; performing a reaction for 0.5-6 hours at 70-130° C.; pressurizing by 2-6 kg/cm$^2$ after performing cooling to room temperature; and standing for 10-50 hours, and curing and drying to obtain a sample 2; and
    (c) mixing the following components in percentage by weight: 5-30% of the sample 1, 5-20% of the sample 2, 55-85% of a chemical fertilizer, 0.5-5% of attapulgite powder and 0.5-5% of sodium alginate to prepare a final product.

2. The fertilizer for cut side slope soil remediation in high altitude areas according to claim 1, wherein the chemical fertilizer is prepared from various effective elements in percentage by weight (by pure nutrients): 5-25% of nitrogen, 3-21% of phosphorus pentoxide and 5-21% of potassium oxide.

3. The fertilizer for cut side slope soil remediation in high altitude areas according to claim 1, wherein the various elements in the chemical fertilizer are provided by the following substances respectively: nitrogen from urea and ammonium phosphate and ammonium sulfate, phosphorus from calcium superphosphate and diammonium phosphate and diammonium phosphate and potassium from potassium chloride and potassium sulfate and potassium dihydrogen phosphate.

4. A fertilizer for cut side slope soil remediation in high altitude areas, comprising the following components: a sample 1, a sample 2, a chemical fertilizer, attapulgite powder and sodium alginate, wherein the sample 1 contains the following components: yak manure, sheep manure, vinasse, sawdust and chitin oligosaccharides; and the sample 2 contains one or more of tartaric acid, lysine, valonia extract and diglycolamine, one or more of water and hydrogen peroxide, borax, zinc sulfate, ferrous sulfate, copper sulfate and manganese sulfate.

5. The fertilizer for cut side slope soil remediation in high altitude areas according to claim 1, wherein the various elements in the chemical fertilizer are provided by the following substances respectively: nitrogen from urea or ammonium phosphate or ammonium sulfate, phosphorus from calcium superphosphate or diammonium phosphate or diammonium phosphate and potassium from potassium chloride or potassium sulfate or potassium dihydrogen phosphate.

* * * * *